United States Patent [19]

Fujiwara

[11] Patent Number: 4,631,514
[45] Date of Patent: Dec. 23, 1986

[54] MALFUNCTION DETECTION ARRANGEMENT FOR JERK CONTROLLED BRAKE COMMAND SYSTEM

[75] Inventor: Tatsuo Fujiwara, Kobe, Japan

[73] Assignee: Nippon Air Brake Co., Ltd., Kobe, Japan

[21] Appl. No.: 720,773

[22] Filed: Apr. 8, 1985

[30] Foreign Application Priority Data

Apr. 26, 1984 [JP] Japan ............................ 59-62751[U]

[51] Int. Cl.$^4$ .................. B60Q 1/00; B60T 13/70; B61B 13/16
[52] U.S. Cl. .................. 340/52 R; 340/52 B; 340/52 C; 340/69; 340/507; 340/309.15; 340/47; 246/182 A; 188/112 R; 303/3; 303/15
[58] Field of Search ............ 340/47, 48, 53, 52 B, 340/52 C, 52 R, 52 F, 69, 500, 501, 506, 507, 309.15, 309.3; 303/3, 15, 104, 20; 246/182 R, 182 A, 182 B, 182 C; 180/271, 275; 188/112 R, 112 A

[56] References Cited

U.S. PATENT DOCUMENTS

3,547,499 12/1970 Maskery .......................... 303/104
3,696,356 10/1972 Franke et al. .................... 340/47

FOREIGN PATENT DOCUMENTS

0034854 9/1981 European Pat. Off. ............ 340/47

Primary Examiner—Donnie L. Crosland
Attorney, Agent, or Firm—G. J. Falce

[57] ABSTRACT

A jerk controlled brake system having a malfunction detecting arrangement for suppressing a malfunction signal due to a normal difference between the jerk control circuit input brake command and the output jerk modified command signal for a time period at least sufficient to allow the delayed jerk modified command signal to match the input brake command signal. The timer circuit controlling this time period is resettable prior to expiration of the preset time period to provide an extended time period, when the brake command signal is repeatedly changed at time intervals less than the preset time period.

13 Claims, 11 Drawing Figures

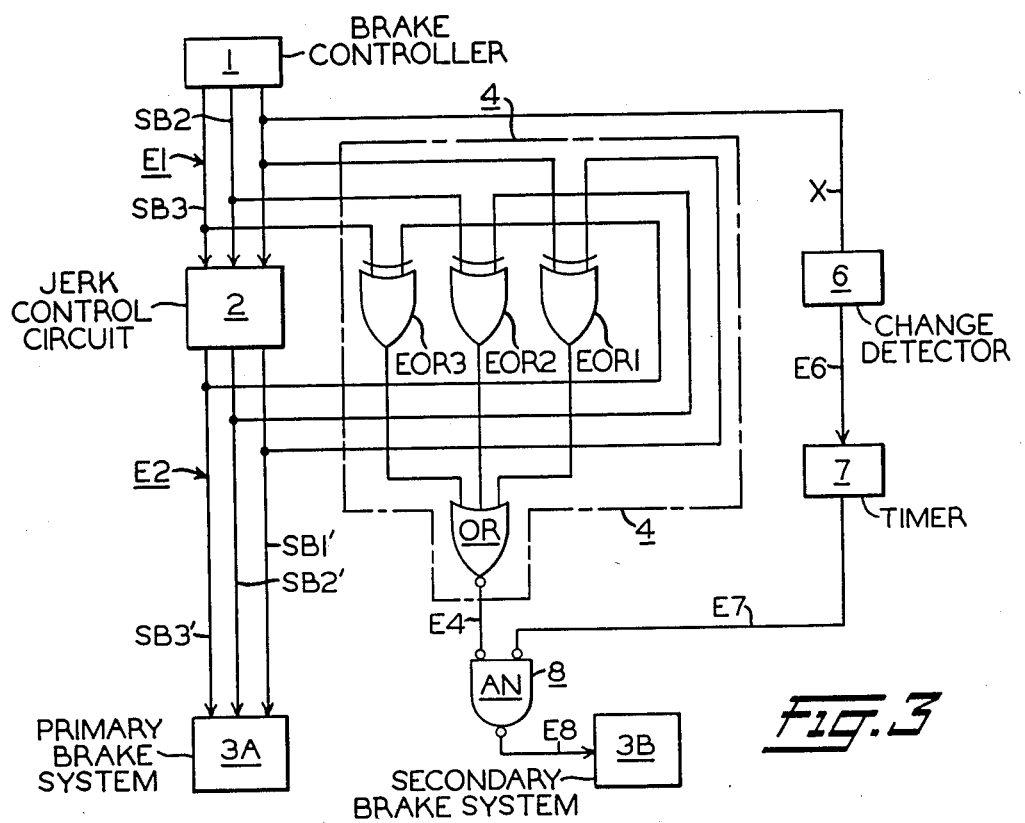
Fig. 3
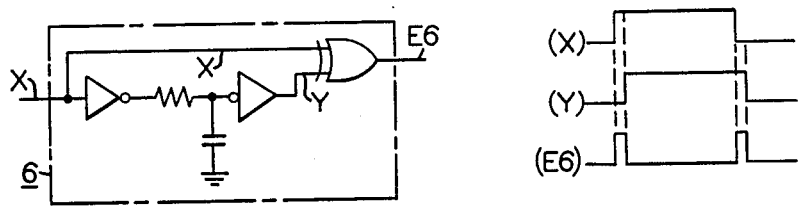
Fig. 4    Fig. 5
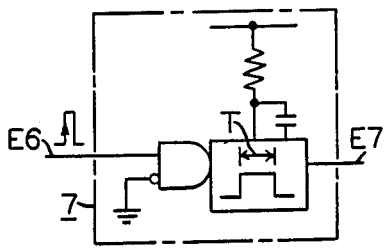 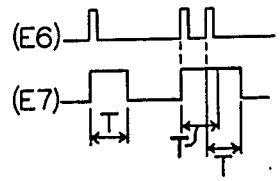
Fig. 6    Fig. 7

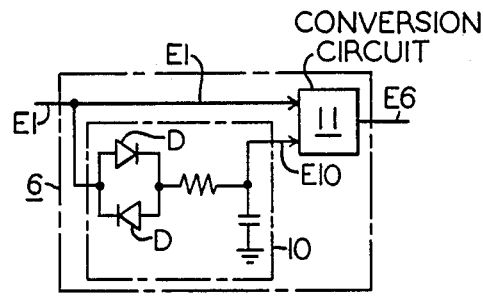
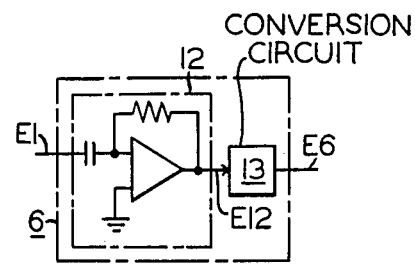
FIG. 8    FIG. 9
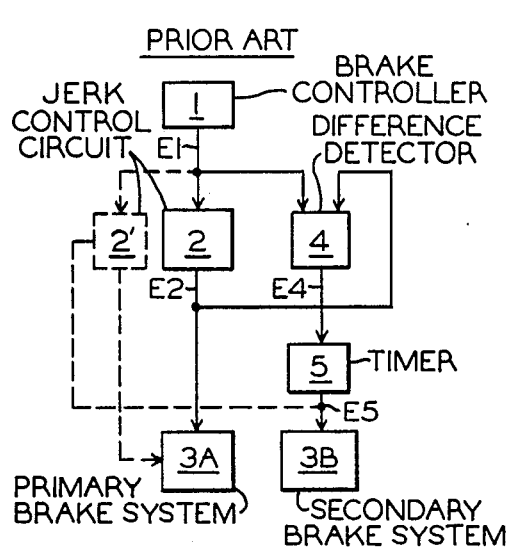
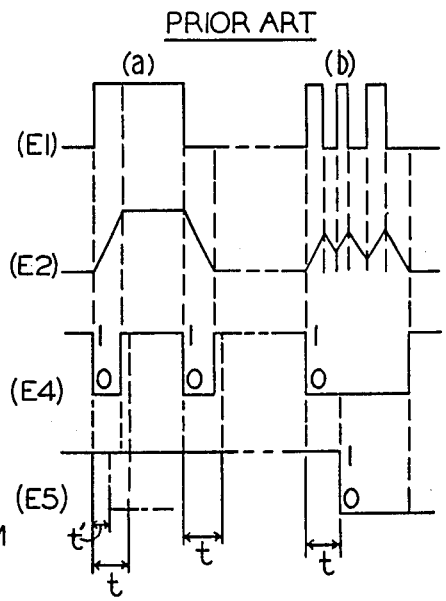
FIG. 10    FIG. 11

4,631,514

MALFUNCTION DETECTION ARRANGEMENT FOR JERK CONTROLLED BRAKE COMMAND SYSTEM

BACKGROUND OF THE INVENTION

The present invention relates to a jerk limit control system for limiting sudden changes in braking force of a railway vehicle, in order to eliminate passenger discomfort, and more particularly to such systems where the jerk limiting function is monitored to detect a malfunction.

One such known system is explained with reference to FIGS. 10 and 11 of the drawings. A brake controller 1 generates an electric brake command signal E1, which is connected to a jerk limit control circuit 2. The output of circuit 2 provides a jerk limit signal E2, which can be seen from the graph of FIG. 11, to exhibit a gradual change in response to instantaneous changes in the brake command signal E1. Jerk limit signal E2 is connected to the primary brake system 3A to control normal brake operation, the changes in braking intensity being without passenger discomfort due to the jerk limiting function.

In addition, the known arrangement includes a difference detector circuit 4, which compares signals E1 and E2, and outputs a malfunction signal E4 anytime a difference exists between signals E1 and E2. Malfunction signal E4 actuates an off delay-type timer, which suppresses the malfunction signal for a predetermined time period (t) following a change in the brake command signal E1 relative to signal E2. Time period (t) is set according to the delay imposed by jerk limit signal E2, in order to prevent a false malfunction indication from being generated by the signal level difference between E1 and E2 during the jerk limiting operation. Timer circuit 5 outputs a signal E5 following time delay (t) to operate a secondary brake system 3B, in the event primary brake system 3A is inoperative due to a malfunction of jerk limit control circuit 2.

As an alternative to the secondary brake system 3B, a redundant jerk limit control circuit 2' may be employed to control the primary brake system in the event a malfunction occurs in the primary jerk limit control system 2. This alternative arrangement is shown by the dotted lines in FIG. 10. In such an arrangement, the secondary brake system 3B may be eliminated, with the output signal E5 of timer circuit 5 initiating operation of redundant jerk limit control circuit 2'.

Either one of these known arrangements serves the purpose of ridding the passengers' feeling of unpleasantness due to sudden changes in braking force resulting from the high degree of response of the primary brake system 3A to the brake command signal E1.

As shown in FIG. 11b, however, a problem in these known systems arises when brake command signal E1 is repeatedly changed at relatively close intervals, i e., intervals of time shorter than the predetermined time period (t) established by timer circuit 5. These repeated changes in brake command signal E1 being at such close intervals, signal E2 does not have sufficient time to rise or fall to the level of signal E1, and difference detector 4 continuously outputs malfunction signal E4, as represented by a logical "0" state in the graph of FIG. 11b, beyond time period (t). Accordingly, the timer circuit output signal E5 is generated, not in response to a difference between signals E1 and E2 resulting from a malfunction, but instead, from a difference due to repeated brake command changes at relatively short intervals. Thus, a false malfunction is indicated and the secondary brake system 3B, or the redundant jerk control circuit 2', is unnecessarily activated.

The foregoing problem can be overcome by increasing time period (t), but this delays recognition of an actual malfunction of the jerk control circuit 2 and is therefore unsatisfactory from a safety standpoint.

SUMMARY OF THE INVENTION

The object of the present invention, therefore, is to prevent a false malfunction signal from arising due to repeated brake command signal changes at time intervals shorter than a set time period (t) selected in accordance with the response delay characteristic of the jerk limit function.

Briefly this objective is fulfilled by modifying the known arrangement heretofore-discussed to include a change detector that generates a trigger signal each time the brake command signal is changed. This trigger signal is used instead of the difference signal to activate a timer device that is arranged to be reset by each trigger signal. Thus, repeated trigger signals, at intervals shorter than the time period set by the timer, have the effect of extending the time period; which expires a time period (t) following the last trigger signal. The timer output signal is compared with the difference signal at a discriminator circuit which generates the malfunction signal to operate either the secondary brake system 3B or the redundant jerk control circuit 2', only if the difference signal is still present following expiration of the extended time period.

BRIEF DESCRIPTION OF THE DRAWINGS

The foregoing objective and attendant advantages of the invention will become apparent from the following more detailed explanation when taken in connection with the drawings, in which:

FIG. 3 shows the logic of the difference detector and the discriminator circuits of FIG. 1;

FIG. 4 shows the logic of the change detector circuit of FIG. 1;

FIG. 5 is a graph showing the relative signal levels generated in the change detector circuit of FIG. 4;

FIG. 6 shows the logic of the timer circuit of FIG. 1;

FIG. 7 is a graph showing the relative signal levels generated in the timer circuit of FIG. 6;

FIGS. 8 and 9 are alternate change detector circuits adapted for use where analog brake command signals are used instead of digital signals;

FIG. 10 is an example of the known jerk limit control system discussed under the "Background of the Invention"; and FIG. 11 is a graph showing the relative signal levels generated in the known system of FIG. 10.

DESCRIPTION AND OPERATION

The detailed operation of the known brake system of FIG. 10 will be discussed first with reference to FIG. 11.

Figure 1:
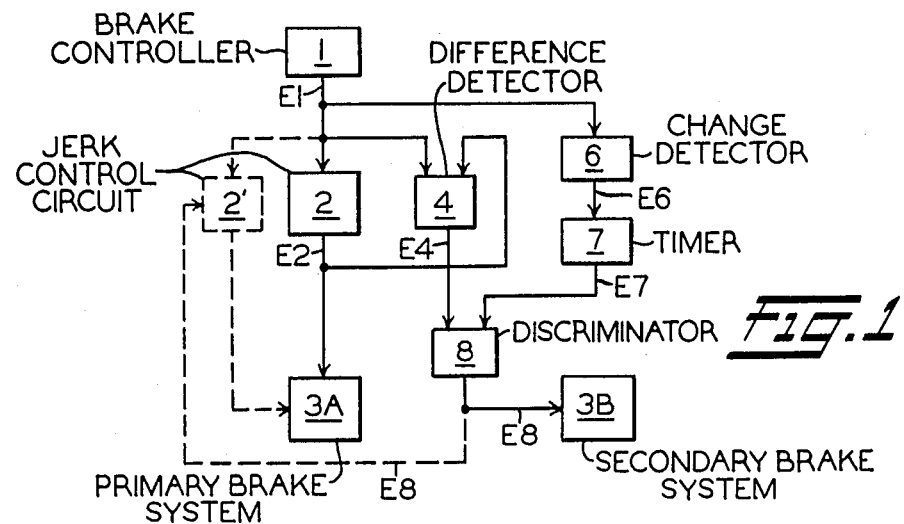
FIG. 1 is a block diagram of a jerk limit control system having a malfunction detection arrangement according to the present invention.

To solve the above-described problems, as shown in FIG. 1, the known system has been modified by the following additions, which comprise the novelty of the present invention.

A change detector 6 detects an up or down change of the brake command signal E1. A timer 7, which recycles each time the detect signal of change detector 6 is input, thereby starts a new time period running before expiration of the previous time period in the event a detect signal occurs before expiration of the time period (t). A discriminator 8 outputs a failure signal, only when the difference detector 4 outputs a detect signal after the preset time from the last operation of timer 7 has expired.

Figure 2:
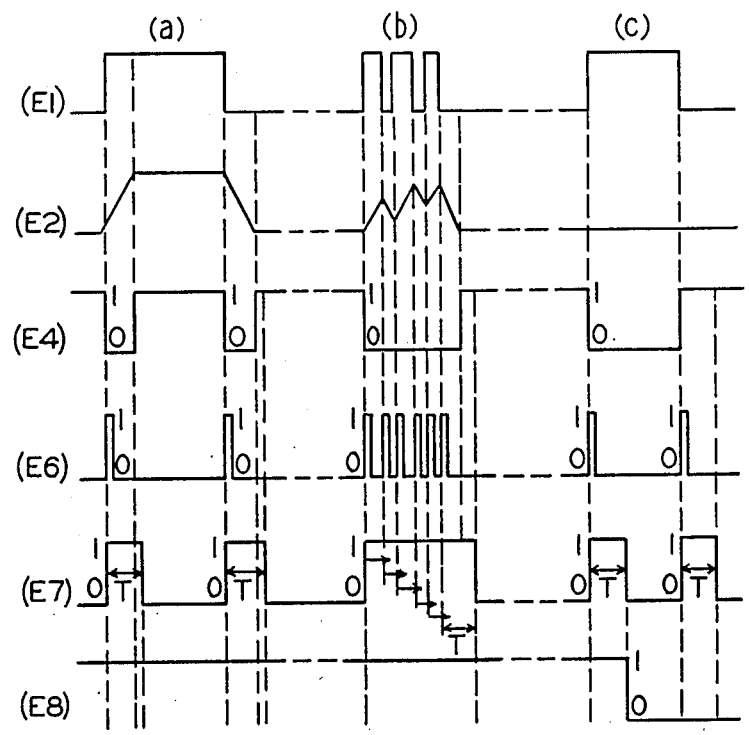
FIG. 2 is a graph showing the relative signal levels generated in the foregoing system for any given point in time, as an aid in understanding the operation of the invention.

The following is an explanation of the present invention with reference to FIG. 1 and FIG. 2. However, the same parts, as in the known invention of FIG. 10, are numbered to correspond with the numbers in FIG. 10 and FIG. 11. The change detector 6 detects each up and down change of the brake command signal E1 and its output.

The difference detector 4 is subject to a brake command signal E1 and a jerk limit signal E2 derived from signal E1. When input E1 and output E2 of the jerk control circuit 2 are the same, signal E4, which is the output of the difference detector, is at a digital logic level "1" and when E1 and E2 are different, signal E4 is at a digital logic level "0". The output of difference detector 4 is the detect signal (see FIG. 11). The above-mentioned off delay-type timer 5 switches its output E5 to a logic "1" when its input becomes "1"; and switches its output E5 to "0" when its input becomes "0" after the preset time (t) has expired. This output "0" is the malfunction signal of the jerk control circuit 2 (see FIG. 11). When a malfunction signal is received from timer 5, the brake system is switched from the primary brake system 3A to the secondary brake system 3B, or from the jerk control circuit 2 to the redundant jerk control circuit 2'. Also, the above-described primary brake system 3A includes an electric brake system and a fluid (air) brake system (neither being specified in the Figure). As is well known, the lack of the electric brake power for the total required brake power, which is specified by brake command E1, is supplemented by fluid brake power.

The above-described secondary brake system 3B may also include both electric and fluid brake systems, but may also include only one of them. Also, the above-described brake systems 3A and 3B may be completely different from the above description.

It is important to note that the preset time (t) of the off delay-type timer 5 should be longer than the adjusting time, during which the output E2 of the jerk control circuit 2 changes from no braking to the maximum brake command signal E1. From now on, this adjusting time will be referred to as the jerk control adjusting time. FIG. 11a shows each part of the operation when the brake command E1 continues longer than (t), which is the timer 5 preset time, and the command receiver 2 is functioning normally.

The lower dashed line in FIG. 11a represents the malfunction signal when the timer 5 preset time (t') is less than the jerk control adjusting time. In this case, the malfunction signal is due to the time period (t') expiring before signal E2 reaches the value of signal E1, and is not due to an actual malfunction. Thus, the time period (t) should be at least as great as the jerk control adjusting time to prevent a false malfunction indication. In other words, in the above-described systems, when the brake command signals E1 and E2 become equal before expiration of the timer 5 preset time (t), indicating the jerk control circuit 2 is normal, the malfunction signal is not output. If the jerk control circuit 2 exhibits an abnormality and its output E2 does not adjust to E1, a malfunction signal is output after timer 5 preset time (t) is past.

E6 is set at "1" for a very short time. This short duration output pulse is the change detect signal of the brake command E1. Timer 7 operates each time when the above-described pulse (change detect signal) is input and the timer keeps this pulse for a preset time T. In other words, when the input pulse becomes "1", the output E7 becomes "1"; and after a preset time T has passed from the previous operation, the output E7 of timer 7 becomes "0".

The output E8 of discriminator 8 is at a logic "1" while timer 7 is running, i.e., the preset time T is in effect, even if the detect signal from the difference detector 4 is input. When the preset time T of timer 7 expires and output E7 becomes "0", output E8 of discriminator 8 becomes "0", provided the detect signal E4 of difference detector 4 is still being input. A logic level "0" of discriminator output E8 is a malfunction signal. Therefore, as shown in FIG. 2b, when the jerk control circuit 2 is functioning normally, and the brake command E1 is changed bit by bit continuously at the brake, the difference detect signal of E1 and E2, which represents the input and output of the jerk control circuit 2, is present.

The change detector 6 detects each change in the brake command E1, and the timer 7 continues to run from the moment when the last detect signal is output till the preset time T has expired. Therefore, if the preset time of timer 7 is set the same or a little longer than the jerk control adjusting time, which is required when going from no braking to the maximum brake command time, it is long enough and it is not necessary to prolong the preset time. Therefore, as shown in FIG. 2c, when the jerk control circuit 2 is really malfunctioning, discriminator 8 outputs a malfunction signal after the preset time T, which is about the same as the jerk control adjusting time.

By this invention, the false malfunction signal, which is output when the brake command E1 changes bit by bit continuously, can be eliminated. Also, if the jerk control circuit 2 is really malfunctioning, the time which is required until the malfunction signal is output, can be shortened by the invention.

Following is a simple explanation of an actual example using FIG. 3 to FIG. 9. In FIG. 3, brake controller 2 is a digital signal generator; and the brake command E1, as well as the output E2 of the jerk control circuit 2, are both three-bit digital signals which form a pure binary code.

The difference detector 4 consists of three EXCLUSIVE-OR gates EOR1, EOR2, EOR3 and one NOR gate OR. The difference detector 4 compares and detects:

each 1st command line SB1 and 2nd command line SB1' at EOR1, each 1st command line SB2 and 2nd command line SB2' at EOR2, each 1st command line SB3 and 2nd command line SB3' at EOR3, and if at least one of these outputs EOR1, EOR2, EOR3 is at a logical "1" level, the NOR gate OR outputs the difference signal E4 at a logical "0" level.

TABLE 1

| Brake Level | Brake Command E1 | | |
|---|---|---|---|
| | SB3 | SB2 | SB1 |
| OFF | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

Table 1 shows how the digital state of the respective command lines SB1, SB2 and SB3 changes as the brake command E1 changes. It is clear from this Table that when the brake level is changed, the 1st command line SB1 always changes. In this example, the change in the 1st command line SB1 can be recognized as a change in the brake command E1. In other words, only the 1st command line SB1 is input to change detector 6 out of the three 1st command lines. This change detector 6 uses a double-sided edge test circuit which is described on Page 53 of the book "Basic Hardware Technique"; author, Makoto Ito; published by C. Q. Shuppan K. K. on Dec. 25, 1979. Its construction is shown in FIG. 4 and it operates according to the graph shown in FIG. 5.

In FIG. 5, the short duration pulse E6 is the change detect signal of the brake command E1. In this actual example, the timer 7, which inputs E6, is a retriggerable one-shot circuit which is described on Page 57 of the same book, "Basic Hardware Technique", as the detector circuit. Its construction is shown in FIG. 6 and it operates according to the graph shown in FIG. 7.

The preset time T for this timer 7 is the same or a little longer than the jerk control adjusting time of the jerk control circuit 2. The discriminator 8 uses a minus logic AND gate AN which denies both input and output. Also, this discriminator 8 has an additional function to keep the same signal once the malfunction signal is output. The operation of the actual example in FIG. 3 to FIG. 7 is the same as that in FIG. 2, so that it will not be explained here.

Although a three-bit pure binary coded digital signal for brake command E1 has been considered, a four-bit code may also be feasible. Any bit number—alternatively coded—digital signal may also be used for brake command E1. However, in such a case, each change of multiple command lines must be detected by several change detectors 6 and their OR must be output to detect the change in the brake command E1. However, in such a case, the construction of the change detecting part of brake command E1 becomes more complicated compared with the actual example which is shown in FIG. 3. Although this actual example takes a digital signal for the brake command E1, it can use an analog signal too. The change detectors in such a case are shown in FIG. 8 and FIG. 9.

In FIG. 8, change detector 6 consists of a shift circuit 10 and conversion circuit 11. In the shift circuit 10, the output E10 is $E10=E1-\Delta E$ when the brake command E1 is rising, and $E10=E1+\Delta E$ when the brake command E1 is falling. Here, $\Delta E$ is the voltage drop of the diode D. Therefore, if brake command E1 changes, the inputs E1 and E10 to the conversion circuit 11 exhibit a positive difference, so that the conversion circuit 11 detects this difference and outputs the change detect signal of the brake command E1 as a pulse. In FIG. 9, change detector 6 consists of a differential circuit 12 and conversion circuit 13. The output E12 of the differential circuit 12 is "0" if the brake command E1 is constant, and the output E12 becomes positive or negative if the brake command E1 changes. Therefore, if the brake command E1 changes, the conversion circuit 13 detects the positive or negative input E12 and outputs the change detect signal of the brake command E1 as a pulse.

Having now described the invention, what I claim as new and desire to secure by Letters Patent, is:

1. A railway car brake control system comprising:
   (a) brake controller means for providing a brake command signal according to the amount of braking desired;
   (b) first means for modifying said brake command signal to provide a jerk control signal;
   (c) primary brake means operative in response to said jerk control signal for providing smooth application of braking of said railway car;
   (d) difference detector means for providing a difference signal anytime said brake command and said jerk control signals disagree;
   (e) discriminator means subject to said difference signal for providing a malfunction signal;
   (f) change detector means for providing a change signal anytime said brake command signal is varied; and
   (g) timer means subject to said change signal for initiating a preset time period each time said brake command signal is varied, during which time period, said discriminator means is prevented from providing said malfunction signal, to thereby distinguish the temporary existence of said difference signal due to normal operation of said jerk control means from said difference signal due to abnormal operation of said jerk control means.

2. A railway car brake control system, as recited in claim 1, further comprising secondary brake means operative in response to said malfunction signal.

3. A railway car brake control system, as recited in claim 1, further comprising second means for modifying said brake command signal to provide said jerk control signal in response to the occurrence of said malfunction signal.

4. A railway car brake control system, as recited in claim 1, further characterized in that said brake command signal exhibits a substantially instantaneous signal change and said jerk control signal exhibits a gradual signal change, such that a time delay occurs before said jerk control signal corresponds to said brake command signal.

5. A railway car brake control system, as recited in claim 4, wherein the duration of said preset time period is at least as long as said time delay.

6. A railway car brake control system, as recited in claim 5, further characterized in that said timer means is a resettable timer, whereby an extended time period greater than said preset time period is established when said brake command signal is repeatedly changed at time intervals less than said preset time period.

7. A railway car brake control system, as recited in claim 6, wherein said brake controller means is a digital signal generator providing said brake command signal in the form of a binary coded, three-bit digital signal.

8. A railway car brake control system, as recited in claim 7, wherein said first means for modifying said brake command signal provides said jerk control signal in binary coded, three-bit digital form corresponding to said brake command signal following said time delay.

9. A railway car brake control system, as recited in claim 8, wherein said difference detector means comprises:
   (a) three exclusive OR gates, each having one input subject to a different binary bit of said brake command signal, a second input subject to a corresponding different binary bit of said jerk control signal, and an output; and
   (b) a NOR gate having three inputs, each connected to said output of a respective one of said exclusive OR gates, and an output providing said difference signal.

10. A railway car brake control system, as recited in claim 9, wherein said change detector means is a double-sided edge test circuit having an input subject to one of said binary bits of said three-bit brake command signal, and an output generating a pulse signal in response to each change in the digital state of said one of said binary bits to provide said change signal.

11. A railway car brake control system, as recited in claim 10, wherein said timer means comprises a retriggerable one-shot circuit.

12. A railway car brake control system, as recited in claim 11, wherein said discriminator means comprises an AND gate having one input connected to said output of said NOR gate, another input connected to the output of said timer means, and an output providing said malfunction signal.

13. A railway car brake control system, as recited in claim 6, wherein said brake controller means is an analog signal generator providing said brake command signal in the form of an analog signal.

* * * * *